United States Patent
Nobili

(10) Patent No.: US 11,536,384 B2
(45) Date of Patent: Dec. 27, 2022

(54) GROUP FOR MIXING WATER FOR BATHROOM OR KITCHEN

(71) Applicant: Fabrizio Nobili, San Vittore (CH)

(72) Inventor: Fabrizio Nobili, San Vittore (CH)

( * ) Notice: Subject to any disclaimer, the term of this patent is extended or adjusted under 35 U.S.C. 154(b) by 0 days.

(21) Appl. No.: 17/385,527

(22) Filed: Jul. 26, 2021

(65) Prior Publication Data

US 2022/0034417 A1 Feb. 3, 2022

(30) Foreign Application Priority Data

Jul. 29, 2020 (EP) .................................... 20188416

(51) Int. Cl.
  *E03B 1/00* (2006.01)
  *F16K 11/00* (2006.01)
  *F16K 27/02* (2006.01)

(52) U.S. Cl.
  CPC ........ *F16K 19/006* (2013.01); *F16K 27/0263* (2013.01)

(58) Field of Classification Search
  CPC ............... F16K 19/006; F16K 27/0263; F16K 27/0281; E03C 1/042
  See application file for complete search history.

(56) References Cited

U.S. PATENT DOCUMENTS

| | | | | |
|---|---|---|---|---|
| 4,662,389 A | * | 5/1987 | Igbal | E03C 1/0403 137/359 |
| 4,989,633 A | * | 2/1991 | Humpert | E03C 1/042 137/359 |
| 5,135,022 A | * | 8/1992 | Kovey | E03C 1/0402 4/675 |
| 6,178,981 B1 | * | 1/2001 | Wales | E03C 1/042 251/293 |
| 6,666,227 B2 | * | 12/2003 | Erickson | E03C 1/042 251/293 |
| 8,176,934 B2 | * | 5/2012 | Niver | F16K 27/12 137/359 |
| 11,156,302 B2 | * | 10/2021 | Jones | E03C 1/02 |
| 2018/0313066 A1 | * | 11/2018 | Ye | E03C 1/0408 |
| 2019/0338500 A1 | * | 11/2019 | Berghoff | E03C 1/042 |

FOREIGN PATENT DOCUMENTS

| | | |
|---|---|---|
| EP | 3070208 A1 | 9/2016 |
| WO | 2008/053207 A1 | 5/2008 |

* cited by examiner

*Primary Examiner* — Reinaldo Sanchez-Medina
(74) *Attorney, Agent, or Firm* — Oliff PLC

(57) ABSTRACT

A flush-mounted group for mixing water for a bathroom or kitchen, comprising: a body comprising a valve, designed to be installed in a seat having a given depth with respect a finished surface, a fastening means for fixing the body to the seat, which is adjustable on the body to set the depth at which the body is inset inside the seat, a plate mountable on the finished surface to enclose the body inside the seat and which is provided with an opening for accessing the body, a control member for operating the valve, which is connected to the valve through the opening of the plate. The mixing group comprises a coupling means for connecting together the valve and the control member, which can be adjusted so as to vary a distance between the control member and the valve and ensure correct positioning of the control member inside the opening.

11 Claims, 6 Drawing Sheets

GROUP FOR MIXING WATER FOR BATHROOM OR KITCHEN

The present invention relates to a flush-mounted water mixing group for a bathroom or kitchen.

In particular, the present invention relates to a mixing group of the aforementioned type comprising:
- a body and a valve, designed to be installed in a seat having a given depth with respect to a finished surface;
- a plate which can be mounted on the finished surface so as to enclose the body and valve inside the seat;
- a control member connected to the valve through an opening in the plate.

Even more particularly, the present invention relates to a mixing group of the aforementioned type for regulating the flowrate of the water by means of the control member.

The invention also relates to a mixing group of the aforementioned type also comprising a second control member for regulating the temperature of the water.

BACKGROUND

Flush-mounted water mixing groups, in particular mixing groups designed to be installed inside a seat formed in the wall or in a niche of a bathroom or a kitchen, are known.

The seat is for example a recess which has a depth of between 50 and 120 mm with respect to a finished surface of the wall on which the tiles are mounted and forms the arrival point of a water supply pipe, generally two pipes for supplying hot water and cold water, respectively. The description which follows is provided with reference to a mixing group with two valves, solely by way of example.

The mixing group comprises a body provided with connections for the supply pipes and also provided with two valves designed to regulate flowrate or the temperature of the water.

The body and the respective valves are installed inside the seat so as to remain concealingly enclosed inside it.

In this respect, a plate can be mounted on the finished surface so as to enclose the body inside the seat and is provided with control members for the valves, for example two pushbuttons or control knobs which can be used to operate, from outside the seat, the valves situated inside the seat together with the body.

In such mixing groups it also known that there exists the technical problem of having to correctly position and fix the body inside the seat so that the control members on the plate may correctly operate the valves. In particular it is necessary to ensure the correct position of the body inside the seat, considering that the seat is normally formed before knowing the dimensions of the mixing group which is to be installed, for example during the masonry work carried out in the bathroom or kitchen.

The aforementioned technical problem is normally solved by mounting, at the bottom of the body, feet which are adjustable heightwise.

Basically, the feet are fixed inside the seat, and the body is mounted slidably on the legs of the feet. Since it is able to slide on the legs, the body may be positioned inside the seat to a depth such as to ensure the correct mechanical coupling together of the control members and the valves and in particular the correct installation layout (perpendicular and parallel arrangement).

The technical solution described above, however, is unable to ensure the precise positioning of the control members within the plate, something which is always desirable, in particular in the case of high-quality mixing groups, where the controls are normally coplanar with the surface of the plate or perfectly parallel thereto, for example protruding minimally.

In particular, the plate may have two openings, for example circular openings, for two respective cylindrical control members and, for precise installation, it is necessary not only that the surface of the cylinders facing the user should be flush with the plate, but also that the cylinders should be perfectly centred inside the openings.

These desirable goals are not at all easy to achieve.

Firstly, once the support legs have been cut, it may happen that the installer realizes that the body has been mounted too deep, such that the control members on the valves are inset inside the openings of the plate and are not flush therewith. In this case it may be necessary to replace the support legs, with the result therefore that new replacement parts must be obtained and installation performed again from scratch.

Or else it may happen that one valve is inset more inside the seat than the other valve, for example owing to different cutting of the support legs or if the recessed seat is not uniform and therefore does not form a flat support surface for the feet.

In all these cases, varying the position of the mixing group is time-consuming. The correct result is in any case not guaranteed.

The technical problem underlying the present invention is that of devising a flush-mounted mixing group in which the mixing controls may be perfectly installed in the plate mounted on the finished surface of the bathroom or kitchen, allowing assembly to be performed more quickly and easily and basically overcoming all the drawbacks which hitherto are associated with the systems of the prior art.

SUMMARY

The proposed solution of the present invention is that of providing a mixing group in which an adjustable coupling means is arranged between a control member and the respective valve. In particular, the coupling means adjusts the height of the control member on the valve, thus allowing correct positioning of the control member without having to remove the body of the mixing group already installed inside a recessed seat.

Even more particularly, according to the aforementioned proposed solution, the coupling means is adjustable also after a plate has been mounted on a finished surface of the bathroom or the kitchen, being able to be accessed through an opening in the plate itself. The operations for adjusting the control member are greatly simplified and merely involve removing the control member, adjusting the coupling means—i.e. increasing or reducing the amount by which the coupling means is inset inside the seat—and refitting the control member.

This operation may be rapidly repeated until the perfect alignment between a surface of the plate and a surface of the control member facing the user is achieved.

For example, the coupling means may comprise a (male) threaded rod designed to be screwed or unscrewed into/from a (female) portion on a head of the valve.

Obviously, it is quite possible, still according to the proposed solution of the present invention, for the adjustment of the coupling means to be performed on the control member. For example, it may be the control member which forms a (female) portion on which the (male) threaded rod of the coupling means may be screwed or unscrewed.

Based on the aforementioned proposed solution, the technical problem is solved by a flush-mounted mixing group for a bathroom or kitchen, comprising:
- a body comprising a valve, designed to be installed in a seat having a given depth with respect to a finished surface;
- a fastening member for fixing the body to the seat, which can be adjusted on the body so as to set the depth to which the body is inset inside the seat;
- a plate which can be mounted on the finished surface so as to enclose the body inside the seat and which is provided with an opening for accessing the body;
- a valve control member connected to the valve through an opening in the plate;
- characterized in that it comprises
- coupling means for connecting together the valve and the control member, said coupling means being adjustable so as to vary a distance between the control member and the valve and ensure correct positioning of the control member inside the opening.

In one embodiment, the valve is provided with a threaded connection and the coupling means are provided with a threaded rod, the distance between the control member and the valve being able to be varied by screwing or unscrewing the rod into/from the connection.

The control member comprises a surface designed to face the user during use, the surface being substantially coplanar with the plate during correct positioning of the control member inside the opening.

The coupling means comprise a toothed wheel at one of the rod and said control member comprises a cylindrical portion having a profile for coupling with the toothed wheel.

A surface portion of the valve comprises teeth which can be engaged with the coupling profile of the cylindrical portion.

The coupling profile is situated on an inner side surface of the cylindrical portion and an outer side surface of the cylindrical portion has a diameter which substantially corresponds to a diameter of the opening.

The valve has the function, for example, of regulating the flowrate and opening and closing the flow. A second valve may be used to regulate the temperature.

In this case, the body comprises the second valve, a second control member of the second valve, connected to the second valve through a second opening of the plate, and a second coupling means for connecting together the second valve and the second control member, said second coupling means being adjustable so as to vary a distance between the second control member and the second valve and ensure correct positioning of the second control member inside the second opening.

Further characteristic features and advantages of the mixing group presented above are illustrated in the continuation of the description, provided with reference to the attached figures solely by way of a non-limiting example.

BRIEF DESCRIPTION OF THE ATTACHED FIGURES

DETAILED DESCRIPTION OF EMBODIMENTS OF THE INVENTION

Figure 1:
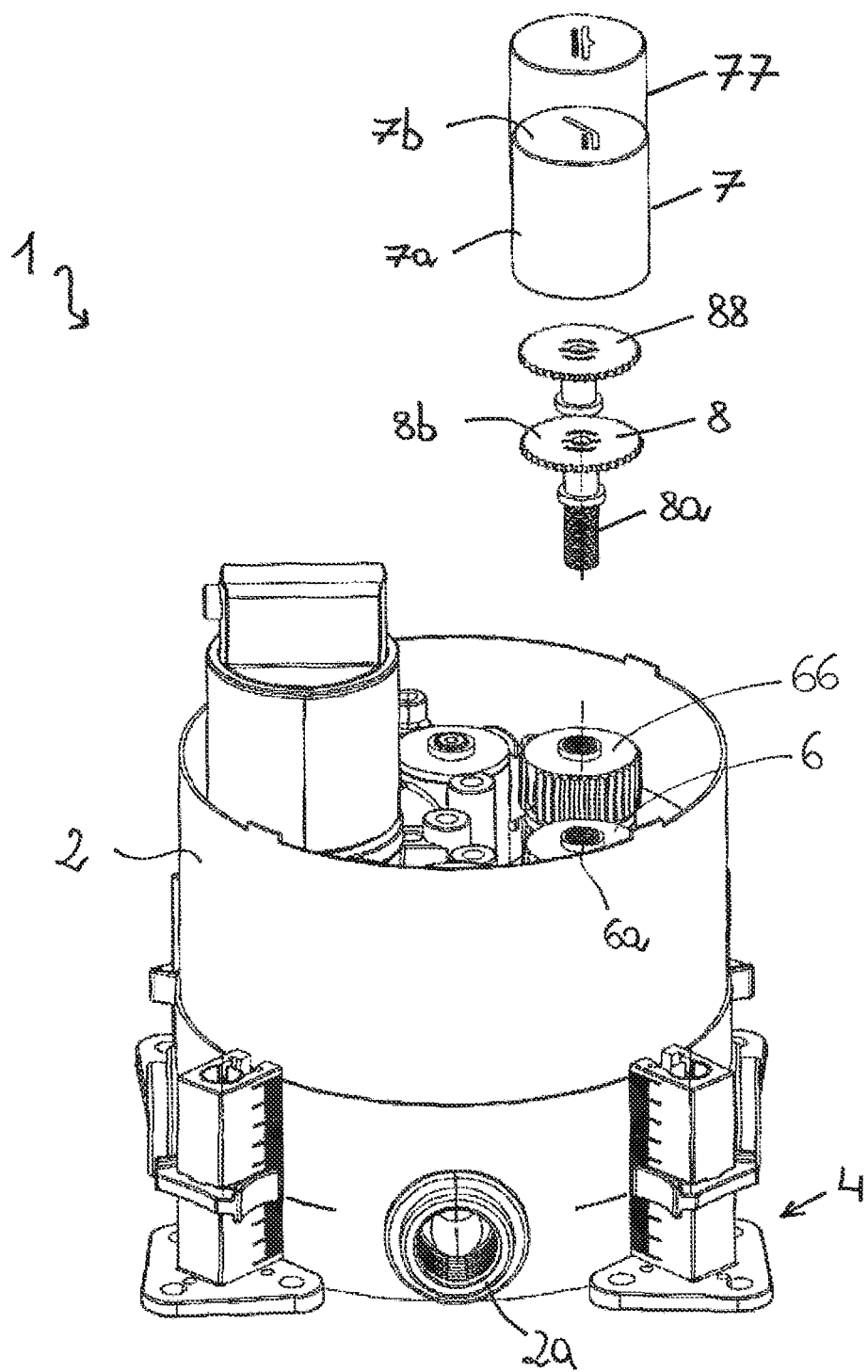
FIG. 1 shows a perspective, exploded, view of the mixing group, without plate, according to the present invention.
Figure 2:
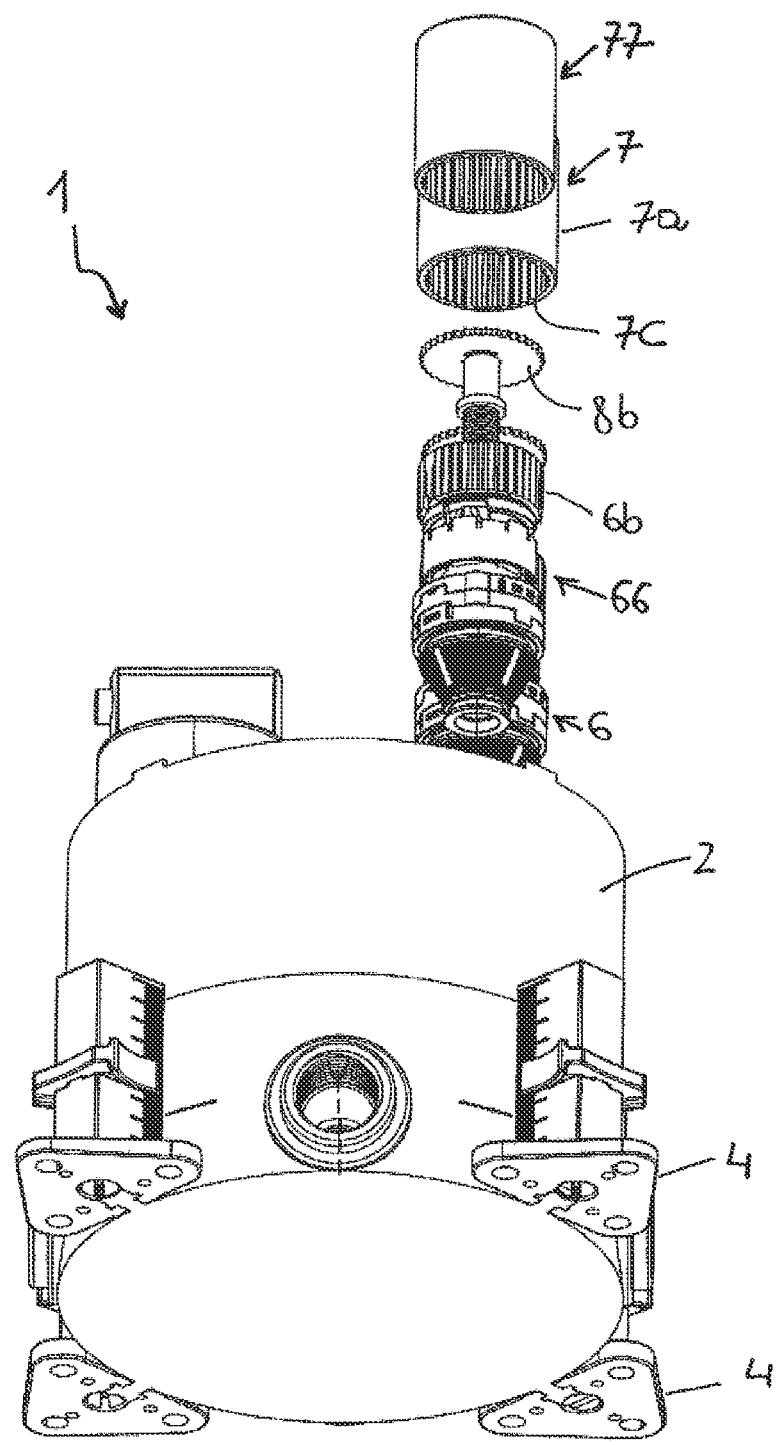
FIG. 2 shows another perspective view from below of the mixing group according to FIG. 1.

With reference to FIGS. 1-6 these figures show in schematic form a mixing group 1 according to the present invention, in particular a mixing group designed to be installed inside a seat (not shown) formed in the wall or in a niche of a bathroom or a kitchen. The seat is for example a recess with a depth of between 50 and 120 mm with respect to a finished surface of the wall on which (again by way of example) tiles are mounted.

The mixing group 1 comprises a body 2 provided with a connection 2a for a water supply pipe which terminates inside the seat. A valve 6, intended to regulate, for example, the water flowrate, is situated inside the body 2.

The body is associated with at least one adjustable foot, preferably with several feet 4 which are adjustable height-wise. The feet 4 are intended to be fixed inside the seat, and the body 2 is mounted slidably on the legs of the feet. The body may thus be positioned inside the seat at a depth suitable for ensuring correct mechanical coupling together of the valve 6 and a respective control member.

The body 2 and the valve 6 are installed inside the seat so as to remain concealingly enclosed inside it. For this purpose, a plate 3 (FIG. 3) is mounted on the finished surface and encloses the body 2 (and the valve 6) inside the seat. A control member 7 for the valve 6, for example a pushbutton or a control knob, is mounted on the valve 6 through the plate 3 and allows operation, from outside the seat, of the valve 6 situated inside the seat. More precisely, the plate 3 has an opening 5 and the control member 7 is movable through the opening 5.

According to the present invention, coupling means 8 are arranged between the valve 6 and the control member 7. The adjustment means 8 are adjustable so as to vary the amount by which the control member 7 projects from the valve 6 and ensure correct positioning of the control member 7 inside the opening 5. In particular, the height of the control member 7 on the valve 6 is adjusted by means of the coupling means 8.

Figure 3:
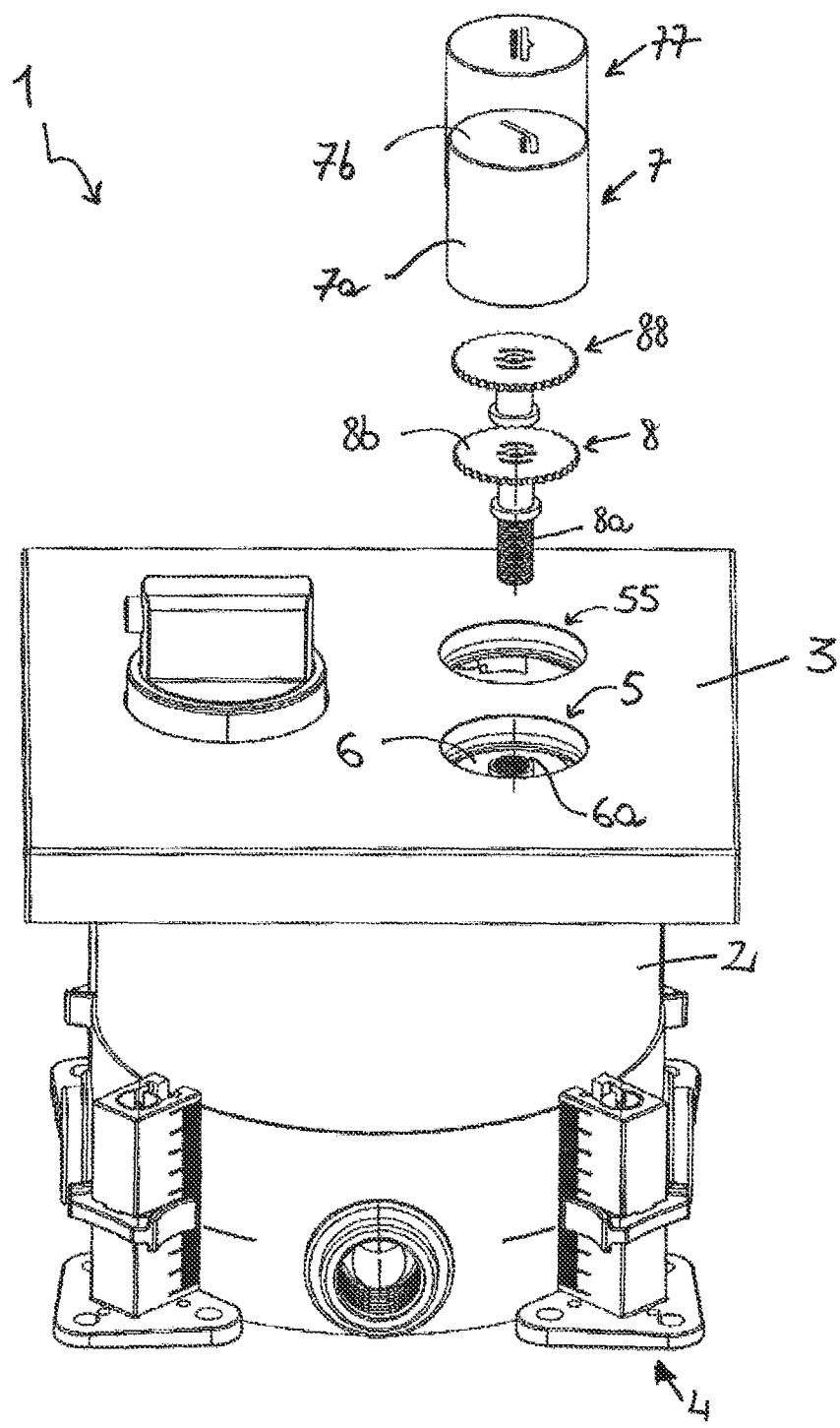
FIG. 3 shows a perspective, exploded, view of the mixing group, with plate, according to the present invention.
Figure 4:
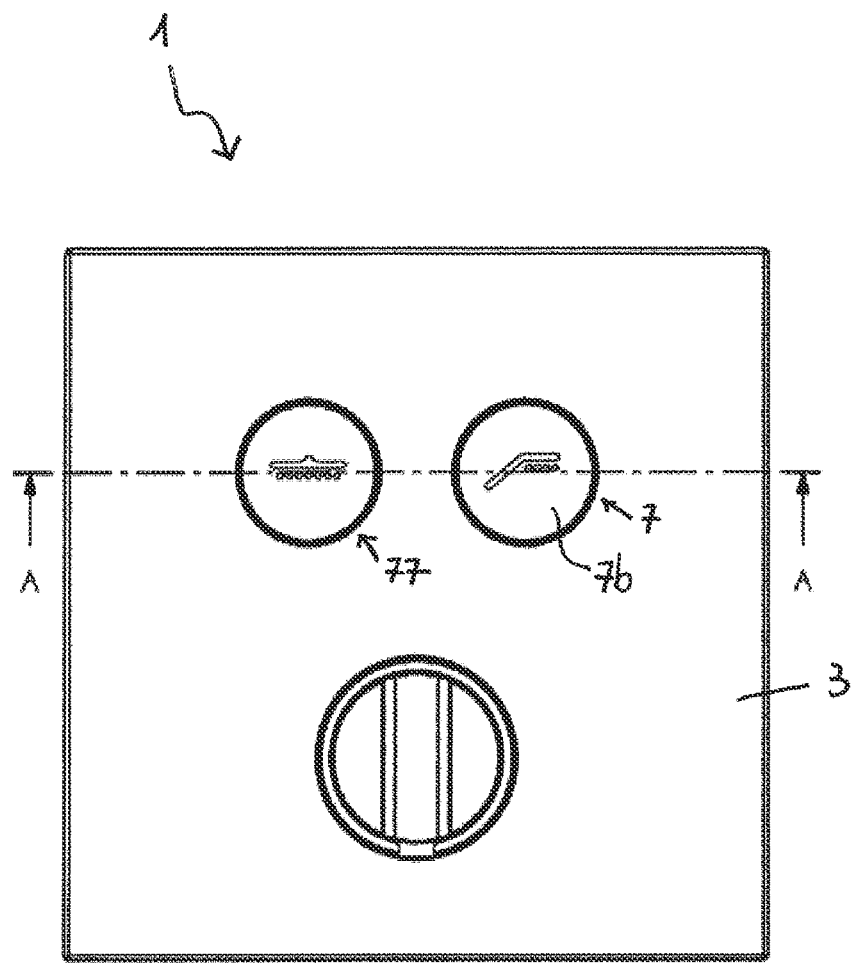
FIG. 4 shows a front view of the mixing group according to the present invention, with parts assembled.
Figure 5:
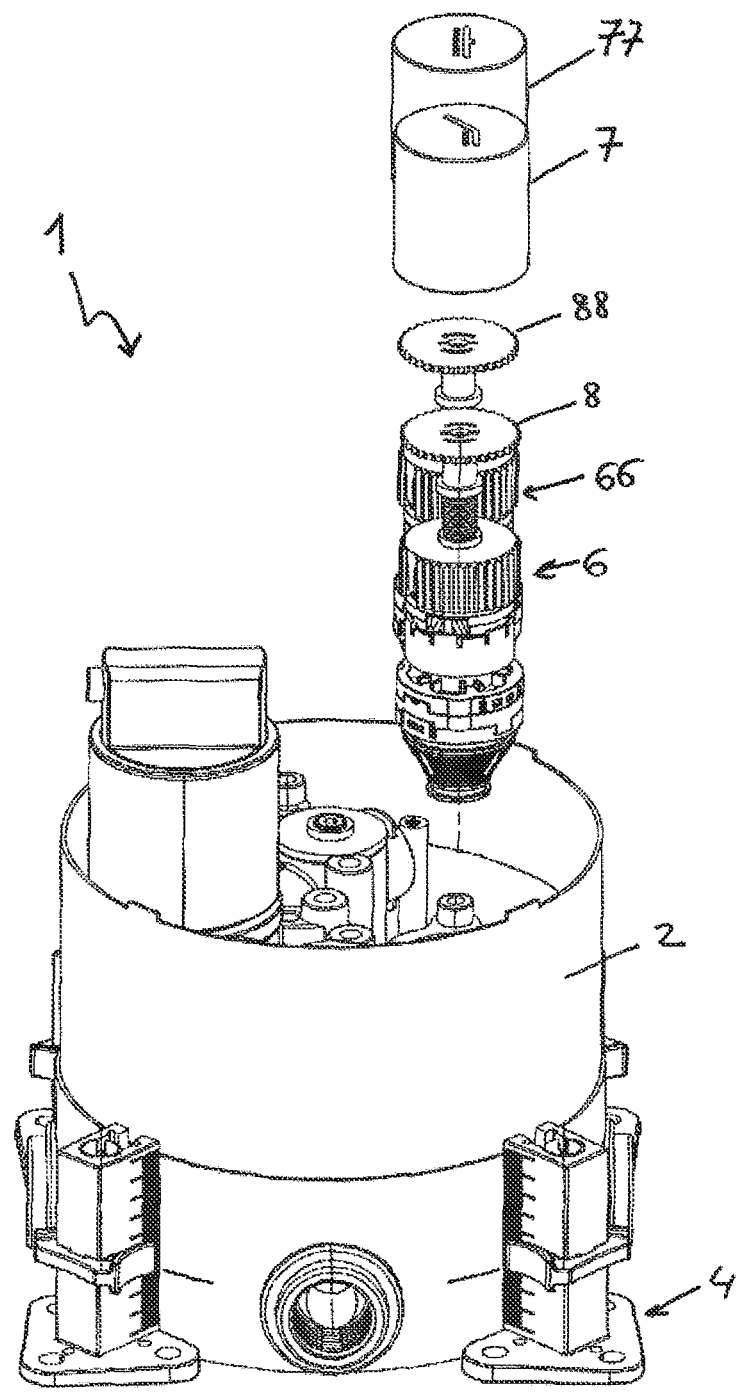
FIG. 5 shows another perspective, exploded, view of the mixing group according to the present invention.
Figure 6:
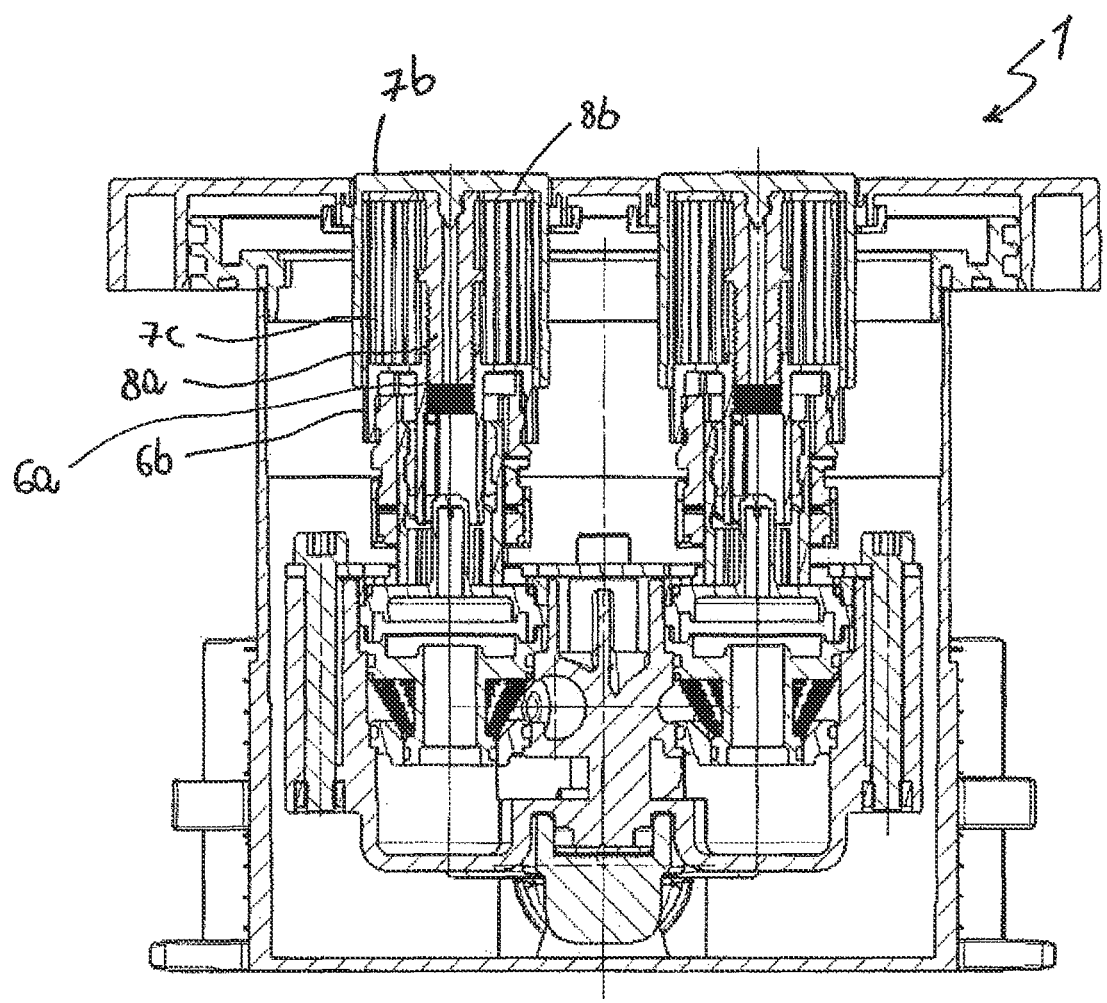
FIG. 6 shows a cross-sectional view of the mixing group according to the present invention, with parts assembled.

Advantageously, as can be seen in FIG. 3, the adjustment may be performed with the body 2 and the valve 6 already installed inside the seat and with the plate 3 already fastened on top of the finished surface. In fact, the coupling means 8 pass through the opening 5 and may therefore be adjusted without disassembling the other components of the mixing group 1.

The coupling means 8 consist of an adjustable spacer situated between the valve 6 and the control member 7.

In one embodiment, the coupling means 8 comprise a threaded screw or rod 8a which can be screwed into and unscrewed from a female thread formed in the head of the valve 6. By simply using a screwdriver or other tool it is possible to unscrew or screw the threaded rod 8a from/into the head of the valve 6, via the opening 5. In this respect, the coupling means may be provided with a shaped part for engaging the end of a screwdriver.

A toothed disc 8b is preferably provided at one end of the threaded rod 8a, opposite to the end which engages with the female thread. The disc has a diameter which is substantially the same as a diameter of the opening 5, which corresponds in turn to a diameter of the control member 7. In the example of embodiment shown, the control member 7 has the form of a hollow cylindrical body with a surface 7b intended, during use, to remain facing the user and situated opposite an opening in the cylindrical body through which the toothed disc 8b is displaced.

The cylindrical body of the control member 7 has a cylindrical portion 7a (side surface) which has, internally, a profile 7c for coupling together with the toothed wheel 8b.

Also a surface portion 6b of the valve 6 comprises teeth which can be engaged with the coupling profile 7c of the cylindrical portion 7a.

Operationally speaking, when the coupling means 8 is positioned on the valve 6, i.e. with the threaded rod 8a screwed by the desired amount into the threaded head of the valve 6, the control member 7 is fitted onto the disc 8, with a corresponding form-fit between the toothed wheel 8b and the coupling profile 7c, and is displaced towards the valve 8 until it comes into contact with it, also ensuring a form-fit between the coupling profile 7c and the teeth of the valve 6. Once said coupling operation has been performed, an angular displacement of the control member 7 corresponds to an identical angular displacement of the valve 6 along the axis of the valve, which rotates integrally with the coupling means 8, without therefore altering the distance between the control member 7 and valve 6.

The control member 7 may be disassembled from the valve 6. According to one embodiment, it is sufficient to pull the control member 7 in order to extract it from the valve 6 and from the coupling means 8. Then, if it is required to perform an adjustment of the control member heightwise (i.e. of its projection from the opening 5), the control member 7 is removed, freeing the opening 6 and thus allowing screwing or unscrewing of the threaded rod 8a. Once the threaded rod has been adjusted, the control member 7 is mounted again onto the coupling means 8 and onto the valve 6.

The above description provided in relation to the valve 6 is also applicable to a second valve, which is for example used for regulating the temperature. In particular, the mixing group (body 2) may comprise a second valve 66, a second control member 77 of the second valve 66, connected to the second valve 66 through a second opening 55 in the plate 3, and a second coupling means 88 connecting together the second valve 66 and the second control member 77. The second coupling means 88 is adjustable so as to vary a distance between the second control member 77 and the second valve 66 and ensure correct positioning of the second control member 77 inside the second opening 55.

The invention claimed is:

1. A flush-mounted group for mixing water for a bathroom or kitchen, the flush-mounted comprising:
    a body comprising a valve, configured to be installed in a seat having a given depth with respect to a finished surface;
    a fastening member for fixing the body to the seat, adjustable on the body to set the depth to which the body is inset inside the seat;
    a plate mountable on the finished surface so as to enclose the body inside the seat and comprising an opening for accessing the body;
    a control member for operating the valve, connected to the valve through the opening of the plate; and
    coupling means for connecting together the valve and the control member, said coupling means being adjustable to vary a distance between the control member and the valve and ensure correct positioning of the control member inside the opening, wherein
    the valve comprises a female threaded connection in a head of the valve, and
    the coupling means comprises a threaded rod engaging with the female threaded connection, the distance between the control member and the valve being variable by screwing or unscrewing the threaded rod into/from the female threaded connection in the head of the valve.

2. The flush-mounted group according to claim 1, wherein said control member comprises a surface configured to face a user during use, the surface being substantially coplanar with the plate when the control member is correctly positioned inside the opening.

3. The flush-mounted group according to claim 1, wherein said coupling means comprises a toothed wheel at one end of the threaded rod and said control member comprises a cylindrical portion having a profile for coupling together with the toothed wheel.

4. The flush-mounted group according to claim 3, wherein the coupling profile is on an inner side surface of the cylindrical portion and an outer side surface of the cylindrical portion has a diameter corresponding to a diameter of the opening.

5. The flush-mounted group according to claim 3, wherein the valve comprises a surface portion including teeth which can be engaged with the coupling profile of the cylindrical portion.

6. The flush-mounted group according to claim 1, wherein the body comprises
    a second valve,
    a second control member for operating the second valve, connected to the second valve through a second opening in the plate, and
    a second coupling means for connecting together the second valve and the second control member, said second coupling means being adjustable to vary a distance between the second control member and the second valve and ensure correct positioning of the second control member inside the second opening.

7. An assembly method for a flush-mounted group for mixing water for a bathroom or kitchen, the assembly method comprising:
    mounting a body comprising a valve inside a seat having a given depth with respect to a finished surface;
    adjusting a fastening member for fixing the body to the seat to set the depth to which the body is inset inside the seat;
    mounting a plate on the finished surface to enclose the body inside the seat, the plate comprising an opening for accessing the body;
    coupling a control member together with the valve through the opening in the plate; and
    adjusting a coupling means connecting together the valve and the control member to vary an amount by which the control member projects from the valve and ensure correct positioning of the control member inside the opening, wherein
    the projection between the control member and the valve is varied by screwing or unscrewing a threaded rod of said coupling means into/from a female threaded connection in a head of said valve.

8. The assembly method according to claim 7, wherein said coupling means comprises a toothed wheel at one end of the threaded rod and said control member comprises a cylindrical portion having a profile for coupling together with the toothed wheel, and said coupling the control member together with the valve comprises mounting the cylindrical portion of the control member onto the toothed wheel of the coupling means.

9. The assembly method according to claim 8, wherein:
the coupling profile is on an inner side surface of the cylindrical portion, and
an outer side surface of the cylindrical portion has a diameter corresponding to a diameter of the opening and a surface portion of the valve comprises teeth configured to be engaged with the coupling profile of the cylindrical portion, and
said coupling the control member together with the valve further comprises mounting the cylindrical portion of the control member onto the surface portion of the valve.

10. The assembly method according to claim 9, wherein said coupling is performed by axial sliding of the control member on the toothed wheel and on the surface portion, along an axis of the valve.

11. The assembly method according to claim 10, wherein adjusting the coupling means for connecting together the valve and the control member comprises screwing or unscrewing the threaded rod along the axis of the valve.

\* \* \* \* \*